Figure 1:
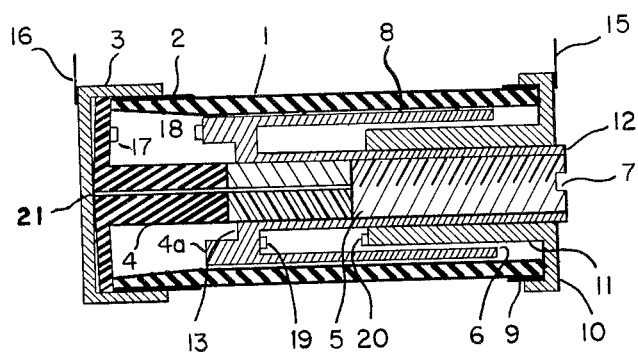

Nov. 23, 1965  R. U. CLARK  3,219,893
VARIABLE CAPACITY TRIMMER CONDENSERS
Filed March 21, 1962

INVENTOR
Richard U. Clark

United States Patent Office 3,219,893
Patented Nov. 23, 1965

3,219,893
VARIABLE CAPACITY TRIMMER CONDENSERS
Richard U. Clark, 4 Orchard Drive, West Acton, Mass.
Filed Mar. 21, 1962, Ser. No. 181,402
1 Claim. (Cl. 317—249)

The present application is a continuation-in-part of my prior application, Serial No. 566 filed January 5, 1960 now Patent No. 3,027,504 for variable capacity trimmer condensers.

The present condenser has to do with variable capacity trimmer condensers, especially of the telescopic tubular type and also of the type that is compensated so as to retain any capacity setting within its range at a very constant value regardless of temperature variations from the normal ambient values.

The prior application Serial No. 566 now Patent No. 3,027,504, covers a means of compensating for any change in capacity due to temperature change by means of double directional expansion of the movable electrode, which is positioned relatively to a fixed electrode of the condenser by an insulated feed screw, part of the capacity change due to temperature variations in the length of the feed screw being offset by expansions or contraction of one part of the movable electrode. This expansion or contraction of the movable electrode section reverses the direction of the electrode movement caused by change in length of the feed screw. Also vernier control of temperature effect is obtained by gradually reducing the cross section of the condenser dielectric member at the point of approach to maximum capacity adjustment.

It is an object of the present invention to improve the degree of stability control of capacity with change of temperature. It is also an object to provide a simple form of stopping mechanism to prevent tuning the condenser beyond the high and low limits of the capacity desired. A further object is to provide a device to control the expansion and contraction of the feed screw along its longitudinal axis.

The novel mechanism for improving the stability factor in respect to temperature variation in the present device is to provide a nonconducting feed screw onto which the condenser's movable electrode threads with the said screw having a flange of conical configuration being concave on the side toward the feed screw shank and convex on the other side. With this configuration and the flange fixed to the condenser assembly at its periphery, but free to move at its axis, in response to thermal expansion or contraction effects in the flange any expansion of the feed screw being offset by expansion or contraction of one tire shank to move slightly in a direction away from the flange will be offset by a slight counter movement of the entire shank as a result of a compensating, temperature caused, movement at the junction of the feed screw shank and flange.

Another method of controlling the longitudinal expansion of the feed screw is to reenforce it with a core material of high strength said core material having a high tensile rating and a low thermal expansion coefficient that will thus be imparted to the feed screw.

The present condenser consists basically of a dielectric tube having one electrode fixed at one end of the tube on its outside surface, as by applying a metallized coating. Inside of the said tube is a cylindrical electrode having an overhang at one end and a reentrant configuration at the other combined with a central shank which contains a female thread throughout its entire length. This threaded section feeds onto a non-conducting screw having a flange at one end that is held at its periphery against the end of the dielectric tube being confined within a metal end cap. The center section of the feed screw is free to move along the center line of the dielectric tube. A hub like end cap closes the remaining end of the dielectric tube and being made with a central bore into which the electrode shank member fits a means is thus provided for turning the electrode by the use of a small screw driver fitted to a slot in the end of the hollow electrode shank.

The overhang in the movable electrode provides the desired reverse expansion of a portion of the electrode to compensate for expansion of the feed screw which forces part of the movable electrode away from the metallized dielectric area during any rise in temperature in the condenser. The displacement of the feed screw toward the metallized area due to the angular expansion of the flange will of course provide extra compensation for the above mentioned expansion of the feed screw shank.

A further improvement in the present condenser has been effected by means of adding stops in the form of special pips on the feed screw flange, the electrode overhang end and the tubular electrode shank as well as the slide tube in the end cap, through which electrode turning and also adjustment is controlled.

The stopping pips on the movable electrode can be preformed or applied before the condenser is assembled also the pip on the slide tube which latter controls the stopping point at the low capacity adjustment. The pip on the plastic stud flange can be applied after the condenser has been fully assembled by various mechanical operations of drilling and inserting a plug, or indenting. I have however made a novel improvement in determining where to place the latter pip which consists of forming the pip on the electrode overhang of a magnetic or a magnetized material so that its exact position can be detected without removing the end, or end cap.

Figure 2:
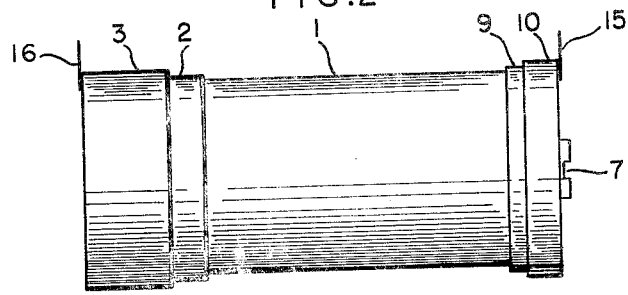

Turning now to the drawing of my present invention FIGURE 1 is a cross-sectional view of the condenser taken in a plane parallel to its longitudinal axis and in FIGURE 2 there is shown a plan view of the condenser.

In FIGURE 1 there is shown at 1 an insulating tube, preferably of low electrical loss glass, ceramic or plastic of the high temperature type. Covering a portion of the outside surface of this tube at one end there is deposited a metal coating 2, which acts as the fixed electrode of the condenser and has soldered to it a metal cup 3. Between this cup and the abutting end of the low loss tube there is also positioned a shouldered or flanged feed screw of an insulating material at 4. This screw engages with a tapped hole 5 in the shank portion 12 of the movable electrode 8. This member 12 has a notch at its free end for adjustment tools. In FIGURE 1 the reference numeral 6 shows the free end of the movable electrode shell where the re-entrant space between it and the electrode shank begins.

At the end of the low loss or dielectric tube, adjacent the hub end of the electrode, there is deposited a metal coating 9 to which coating is soldered a hub carrying slide tube cap 10 the hub section being indicated by the character 11. This section fits into the reentrant space between the electrode shell 8 and the electrode shank 12. The free end of this slide tube hub has a small projection or pip attached to it at 20 which cooperates with a pip 19 on the movable electrode causing same to stop turning during adjustment at a given desired point. This stop is for the minimum capacity adjustment. At 17 and 18 there are also shown pips for the maximum capacity adjustment to be registered at the desired point as outlined above.

At 13 in FIGURE 1 is shown the recess formed by the overhang of the electrode at 4a, this being provided for double direction expansion. The feed screw 4 also has a central core when so desired as at 21, this being to reduce its normal expansion range under temperature increases and decreases. The feed screw flange with the slightly conical configuration supports the pip 17 as mentioned above, but is free to move very slightly at its apex, although held firmly at the periphery of the flange. The core 21 can be of a very strong low expansion material.

When the electrode shank 12 is turned using the slot 7 to engage a turning tool, the electrode moves along the feed screw to vary the capacity. The connections 15 and 16 connect electrically to the movable and fixed electrodes respectively.

The plan view of FIGURE 2 is shown to give a better view of the metal bands 2 and 9 and the end caps 3 and 10.

Having described my invention, I claim:

In combination in a variable trimmer condenser, having a hollow tubular dielectric member having a first and second peripheral surface adjacent its first and second open ends, a first and second metal electrode coating overlying said first and second peripheral surfaces, a metallic end cap closing the first end of the dielectric member and in contact with the first metal electrode coating, a feed screw of nonconductive material having an integral two faced flange portion with a periphery surface at one end and a reinforced externally threaded shank portion, said externally threaded shank portion disposed axially within said tubular dielectric member, one face of said flange adjacent said externally threaded shank portion being concave and the opposite face convex, the said flange portion located at the first end of said dielectric member and held in place by the end cap in contact with the periphery surface of the flange, said flange having a nonconductive pip on its concave face, and an electrode within the dielectric tube, said electrode having an internally threaded shank portion engaging the externally threaded shank portion of the feed screw, a metal shell integral with and attached to the internally threaded shank portion at one end axially therewith, said tubular metal shell having an overhanging rim section at the end adjacent to the internally threaded shank portion nearest said feed screw flange, a projecting magnetic pip on one part of the overhanging rim section cooperating with the non-conducting pip on the feed screw flange surface as a rotational stop, the said tubular electrode being movable within the said dielectric tube by rotating the internally threaded electrode shank portion by means of a slot located at its free end, a round slide tube with a folded back cap-like termination at one end, said cap-like termination being affixed to the second electrode coating on the dielectric tube and the slide tube fitting axially within the dielectric tube between the internally threaded shank portion and the tubular electrode shell.

References Cited by the Examiner

UNITED STATES PATENTS

| 2,911,850 | 11/1959 | Schmidt | 74—10.2 |
| 3,027,504 | 3/1962 | Clark | 317—249 |
| 3,051,879 | 8/1962 | Lazar et al. | 317—249 |

FOREIGN PATENTS 500,428    2/1939    Great Britain.

JOHN F. BURNS, *Primary Examiner.*

DARRELL L. CLAY, *Examiner.*